US010289912B1

(12) United States Patent
Vijayanarasimhan et al.

(10) Patent No.: US 10,289,912 B1
(45) Date of Patent: May 14, 2019

(54) CLASSIFYING VIDEOS USING NEURAL NETWORKS

(71) Applicant: Google LLC, Mountain View, CA (US)

(72) Inventors: Sudheendra Vijayanarasimhan, Mountain View, CA (US); George Dan Toderici, Mountain View, CA (US); Yue Hei Ng, College Park, MD (US); Matthew John Hausknecht, Austin, TX (US); Oriol Vinyals, Palo Alto, CA (US); Rajat Monga, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 117 days.

(21) Appl. No.: 15/143,218

(22) Filed: Apr. 29, 2016

Related U.S. Application Data

(60) Provisional application No. 62/154,433, filed on Apr. 29, 2015.

(51) Int. Cl.
*G06K 9/00* (2006.01)
*G06K 9/62* (2006.01)

(52) U.S. Cl.
CPC ..... *G06K 9/00718* (2013.01); *G06K 9/00744* (2013.01); *G06K 9/628* (2013.01); *G06K 9/6245* (2013.01); *G06K 9/6257* (2013.01)

(58) Field of Classification Search
CPC .......... G06K 9/00684; G06K 9/00751; G06K 9/6245; G06K 9/628
See application file for complete search history.

(56) References Cited

U.S. PATENT DOCUMENTS

| 9,836,853 | B1 * | 12/2017 | Medioni | G06N 3/0445 |
| 9,858,524 | B2 * | 1/2018 | Bengio | G06F 17/28 |
| 2016/0035344 | A1 * | 2/2016 | Gonzalez-Dominguez | |
| | | | | G10L 15/005 |
| | | | | 704/254 |
| 2016/0099010 | A1 * | 4/2016 | Sainath | G10L 25/30 |
| | | | | 704/232 |

(Continued)

OTHER PUBLICATIONS

J. Donahue et al., "Long-Term Recurrent Convolutional Networks for Visual Recognition and Description," in IEEE Transactions on Pattern Analysis and Machine Intelligence, vol. 39, No. 4, pp. 677-691, Apr. 1, 2017.*

(Continued)

*Primary Examiner* — Chan Park
*Assistant Examiner* — Mai Tran
(74) *Attorney, Agent, or Firm* — Fish & Richardson P.C.

(57) ABSTRACT

Methods, systems, and apparatus, including computer programs encoded on computer storage media, for classifying videos using neural networks. One of the methods includes obtaining a temporal sequence of video frames, wherein the temporal sequence comprises a respective video frame from a particular video at each of a plurality time steps; for each time step of the plurality of time steps: processing the video frame at the time step using a convolutional neural network to generate features of the video frame; and processing the features of the video frame using an LSTM neural network to generate a set of label scores for the time step and classifying the video as relating to one or more of the topics represented by labels in the set of labels from the label scores for each of the plurality of time steps.

21 Claims, 8 Drawing Sheets

(56) References Cited

U.S. PATENT DOCUMENTS

2016/0140435 A1* 5/2016 Bengio .................. G06F 17/28
                                                                   382/158
2016/0292510 A1* 10/2016 Han .................. G06K 9/00724
2017/0364766 A1* 12/2017 Das .................... G06K 9/00664

OTHER PUBLICATIONS

Alex Krizhevsky, Ilya Sutskever, and Geoffrey E. Hinton. 2012. ImageNet classification with deep convolutional neural networks. In Proceedings of the 25th International Conference on Neural Information Processing Systems—vol. 1 (NIPS'12), F. Pereira, C. J. C. Burges, L. Bottou, and K. Q. Weinberger (Eds.), vol. 1. Curran Associates Inc., USA, 1.*

J. Donahue et al., "Long-Term Recurrent Convolutional Networks for Visual Recognition and Description," in IEEE Transactions on Pattern Analysis and Machine Intelligence, vol. 39, No. 4, pp. 677-691, Nov. 17, 2014.*

Graves, "Generating Sequences with Recurrent Neural Networks," (Jun. 5, 2014) [online] (retrieved from http://arxiv.org/pdf/1308.0850v5.pdf), 43 pages.

Krizhevsky et al., "ImageNet Classification with Deep Convolutional Neural Networks," In Proceedings of Conference on Neural Information Processing Systems (NIPS), pp. 1097-1105, Lake Tahoe, Nevada, US, 2012.

Szegedy et al., "Going Deeper with Convolutions," (Sep. 17, 2014) [online] (retrieved from http://arxiv.org/pdf/1409.4842v1.pdf), 12 pages.

Zach et al., "A Duality Based Approach for Realtime TV-L1 Optical Flow," In Proceedings of the 29th DAGM Conference on Pattern Recognition, pp. 214-223, Berlin, Heidelberg, 2007, Springer-Verlag.

* cited by examiner

CLASSIFYING VIDEOS USING NEURAL
NETWORKS

CROSS-REFERENCE TO RELATED
APPLICATION

This application claims priority to U.S. Provisional Application No. 62/154,433, filed on Apr. 29, 2015. The disclosure of the prior application is considered part of and is incorporated by reference in the disclosure of this application.

BACKGROUND

This specification relates to classifying videos using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM cells that each include an input gate, a forget gate, and an output gate that allow the cell to store previous states for the cell, e.g., for use in generating a current activation or to be provided to other components of the LSTM neural network.

SUMMARY

This specification describes technologies that relate to classifying videos using neural networks. In general, the specification describes systems for classifying videos that use various neural network architectures to classify a video as relating to one or more topics by processing a sequence of video frames from the video.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. The video classification systems described in this specification can effectively combine image information across a video to generate a classification for the video. In particular, the video classification systems can learn a global description of a video's temporal evolution by making use of either LSTM layers or pooling layers to effectively classify the video. Moreover, the video classification systems describe in this specification can maintain a constant and not overly large number of parameters while nonetheless effectively classifying the video.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes video classification systems for classifying videos that use various neural network architectures to classify a video as relating to one or more topics by processing a temporal sequence of video frames from the video.

In particular, the described systems classify the video as relating to one or more topics from a predetermined set of topics, with each of the topics being represented by a respective label, i.e., a word or phrase that characterizes the topic. For example, a topic about cats might be represented by the label "cat" while a topic about dogs might be represented by the label "dog."

The sequence of video frames from the video includes multiple video frames that appear at specific intervals in the video, e.g., every half-second, every second, or every two seconds. In some implementations, the sequence also includes optical flow images that characterize the motion of pixels between two video frames that are adjacent to one another in the video. For example, the optical flow images may characterize the motion of pixels between two video frames that are adjacent when sampled at a higher rate than the video frames in the sequence, e.g., fifteen frames per second. An example technique for generating optical flow images is described in C. Zach, T. Pock, and H. Bischof. A duality based approach for realtime TV-$L^1$ optical flow. In Proceedings of the $29^{th}$ DAGM Conference on Pattern Recognition, pages 214-223, Berlin, Heidelberg, 2007. Springer-Verlag.

In some implementations, the video classification systems use Long Short-Term Memory (LSTM) neural network layers to combine image information across a video in order to classify the video. Such video classification systems are described with reference to FIG. 1 and FIG. 3.

In some other implementations, the video classification systems use one or more pooling layers to combine image information across a video in order to classify the video. Such video classification systems are described with reference to FIGS. 2A-2E and FIG. 4.

Figure 1:
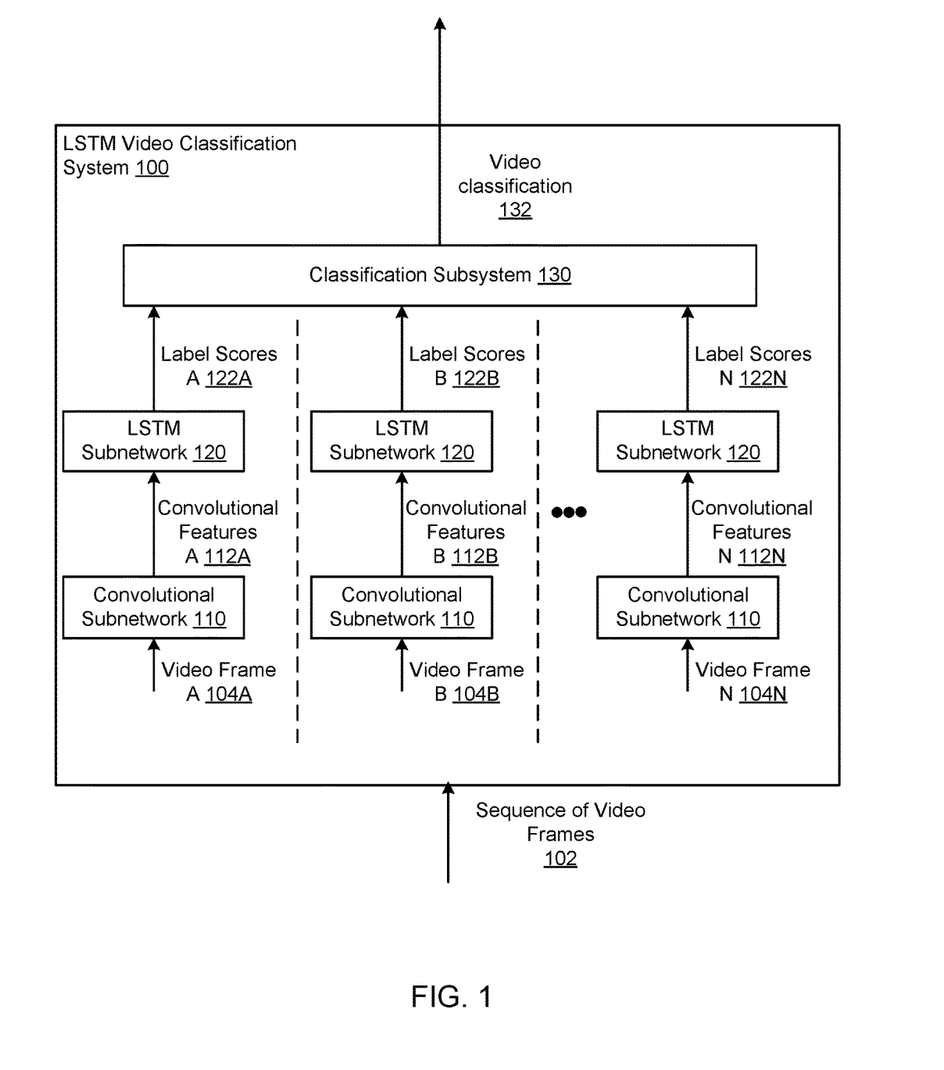
FIG. 1 shows an LSTM example video classification system.

FIG. 1 shows an example LSTM video classification system 100. The video classification system 100 is an example of a system implemented as computer programs on one or more computers in one or more locations, in which the systems, components, and techniques described below are implemented.

The video classification system 100 receives a sequence 102 that includes multiple video frames 104A-104N from an input video and processes the video frames in the sequence to generate a classification 132 for the input video. The classification 132 is data identifying one or more topics to which the video has been classified as relating.

In particular, the video classification system 100 includes a convolutional subnetwork 110, an LSTM subnetwork 120, and a classification subsystem 130.

The convolutional subnetwork 110 is a convolutional neural network that is configured to, for each video frame in the image, process the video frame to generate convolutional features of the video frame. For example, the convolutional subnetwork 110 can process a video frame 104B from the sequence to generate convolutional features 112B of the video frame 104B. The convolutional subnetwork 110 may be any of a variety of convolutional neural networks that are configured to process images. The convolutional features of a given video frame generated by the convolutional subnetwork 110 are a collection of numeric values that characterize the video frame, e.g., a vector of floating point or quantized floating point values.

One example image processing network that can be used as the convolutional subnetwork 110 is described in A. Krizhevsky, I. Sutskever, and G. E. Hinton. ImageNet classification with deep convolutional neural networks. In Proc. NIPS, pages 1097-1105, Lake Tahoe, Nev., USA, 2012. Another example image processing network is described in C. Szegedy, W. Liu, Y. Jia, P. Sermanet, S. Reed, D. Anguelov, D. Erhan, V. Vanhoucke, and A. Rabinovich. Going deeper with convolutions. CoRR, abs/1409.4842, 2014.

The LSTM subnetwork 120 includes one or more LSTM neural network layers and an output layer and is configured to process each of the convolutional features 112A-112N to generate a respective set of label scores 122A-122N for each of the video frames 104A-104N. Each set of label scores includes a respective score for each label in a predetermined set of labels, with each label representing a respective topic.

The LSTM neural network layers each include one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM subnetwork 120.

For each frame in the sequence, the one or more LSTM neural network layers collectively process the convolutional features of the frame to generate an LSTM output. Because the LSTM neural network layers maintain a hidden state, the LSTM output for a given frame will generally depend not only on the frame, but also on frames preceding the frame in the preceding sequence.

The output layer can be, e.g., a softmax layer, and is configured to, for each frame, process the LSTM output for the frame to generate the set of label scores for the frame.

An example LSTM neural network is described in more detail in "Generating sequences with recurrent neural networks," Alex Graves, available at http://arxiv.org/abs/1308.0850v5.

The classification subsystem 130 receives the sets of label scores 122A-122N and classifies the video using the sets of label scores. The classification subsystem 130 can classify the video using the sets of scores in any of a variety of ways.

For example, the classification subsystem 130 can classify the video as relating to the topics that are represented by one or more highest-scoring labels according to the label scores for the video frame in the sequence.

As another example, the classification subsystem 130 can generate a respective combined label score for each of the labels from the label scores for the label among all of the video frames in the sequence. The classification subsystem 130 can then classify the video as relating to the topics that are represented by one or more highest-scoring labels according to the combined label scores.

For example, the classification subsystem 130 can generate the combined label score for a given label by selecting as the combined label score the highest label score for the label from the label scores for the label for all of the frames in the sequence.

As another example, the classification subsystem 130 can generate the combined label score for a given label by summing all of the label scores for the label.

As yet another example, the classification subsystem 130 can generate the combined label score for a given label by assigning a weight to each frame, with weights assigned to frames that are later in the temporal sequence being higher than weights assigned to frames that are earlier in the temporal sequence. The classification subsystem 130 can then generate a weighted label score for the label by, for each frame, multiplying the label score for the label for the frame by the weight for the frame and then generate the combined label score for the label by summing the weighted label scores for the label.

In other implementations, the video classification system uses one or more pooling layers in classifying an input video rather than LSTM neural network layers. While this specification will describe the pooling layers as being max pooling layers, it should be understood by one of ordinary skill in the art that other kinds pooling layers, e.g., average pooling layers, may in some implementations be employed in place of the max pooling layers.

Figure 2A:
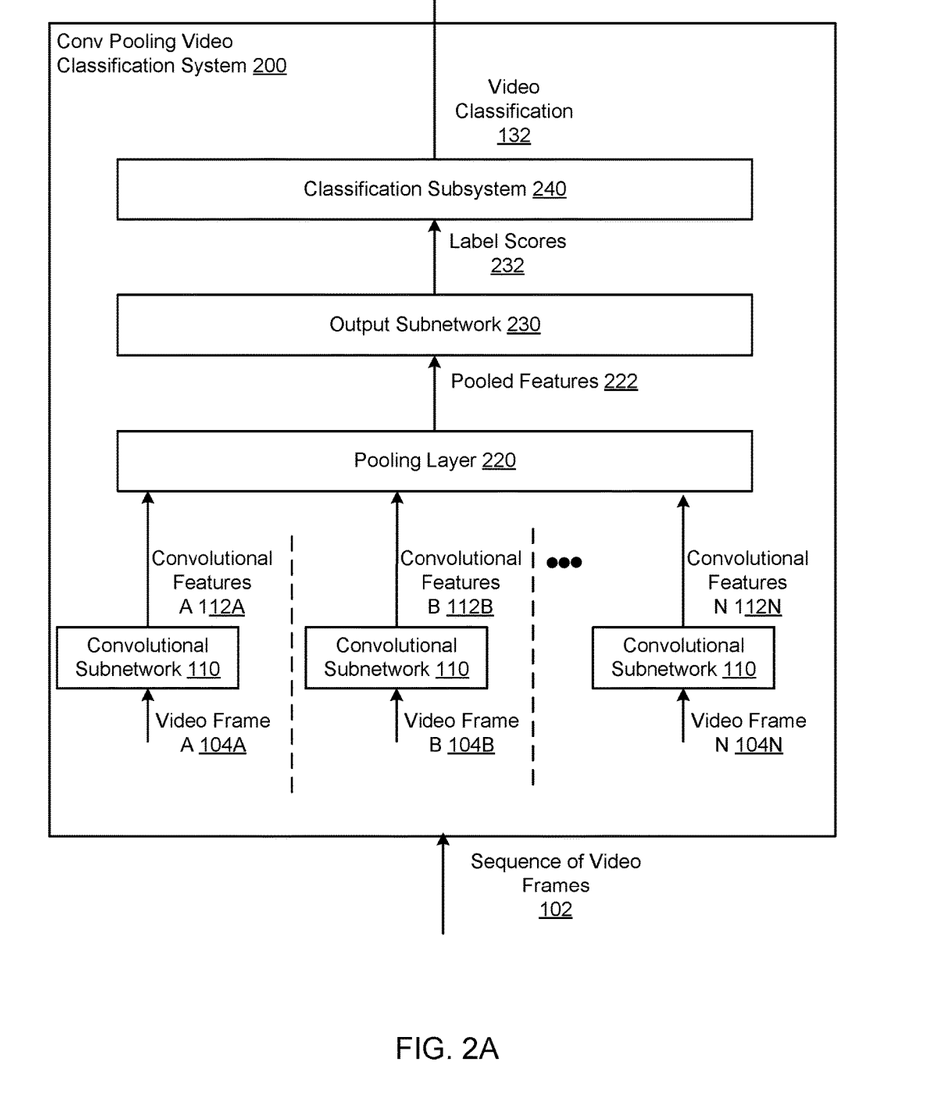
FIG. 2A shows an example cony pooling video classification system.

FIG. 2A shows an example cony pooling video classification system 200.

The video classification system 200 is an example of a system implemented as computer programs on one or more computers in one or more locations, in which the systems, components, and techniques described below are implemented.

In particular, the video classification system 200 includes the convolutional subnetwork 110 that processes each of the video frames 104A-104N in the sequence 102 to generate the convolutional features 112A-N of the video frames, a pooling layer 220, an output subnetwork 230, and a classification subsystem 240.

The pooling layer 220 is configured to perform max pooling on the convolutional features 112A-112N to generate pooled features 222. That is, for each dimension of the convolutional feature vectors, the pooling layer 220 is configured to select the maximum value of the dimension among all of the convolutional features 112A-112N and to set the value of the corresponding dimension in the pooled feature vector 222 to that maximum value.

The output subnetwork 230 is configured to receive the pooled features 222 and to generate a set of label scores 232 that includes a respective score for each label in the predetermined set of labels.

The output subnetwork 230 includes an output layer, e.g., a softmax layer, and, optionally, one or more fully-connected neural network layers.

If the output subnetwork 230 includes only an output layer, the output layer receives the pooled features 222 and generates the set of label scores 232.

If the output subnetwork also includes one or more fully-connected layers, the fully-connected layers are configured to collectively process the pooled features 222 to generate an alternative representation of the pooled features and the output layer is configured to process the alternative representation to generate the set of label scores 232.

The classification subsystem 240 is configured to classify the video based on the set of label scores 232, i.e., by classifying the video as relating to the topics represented by one or more of the highest-scoring labels, to generate the classification data 132.

Figure 2B:
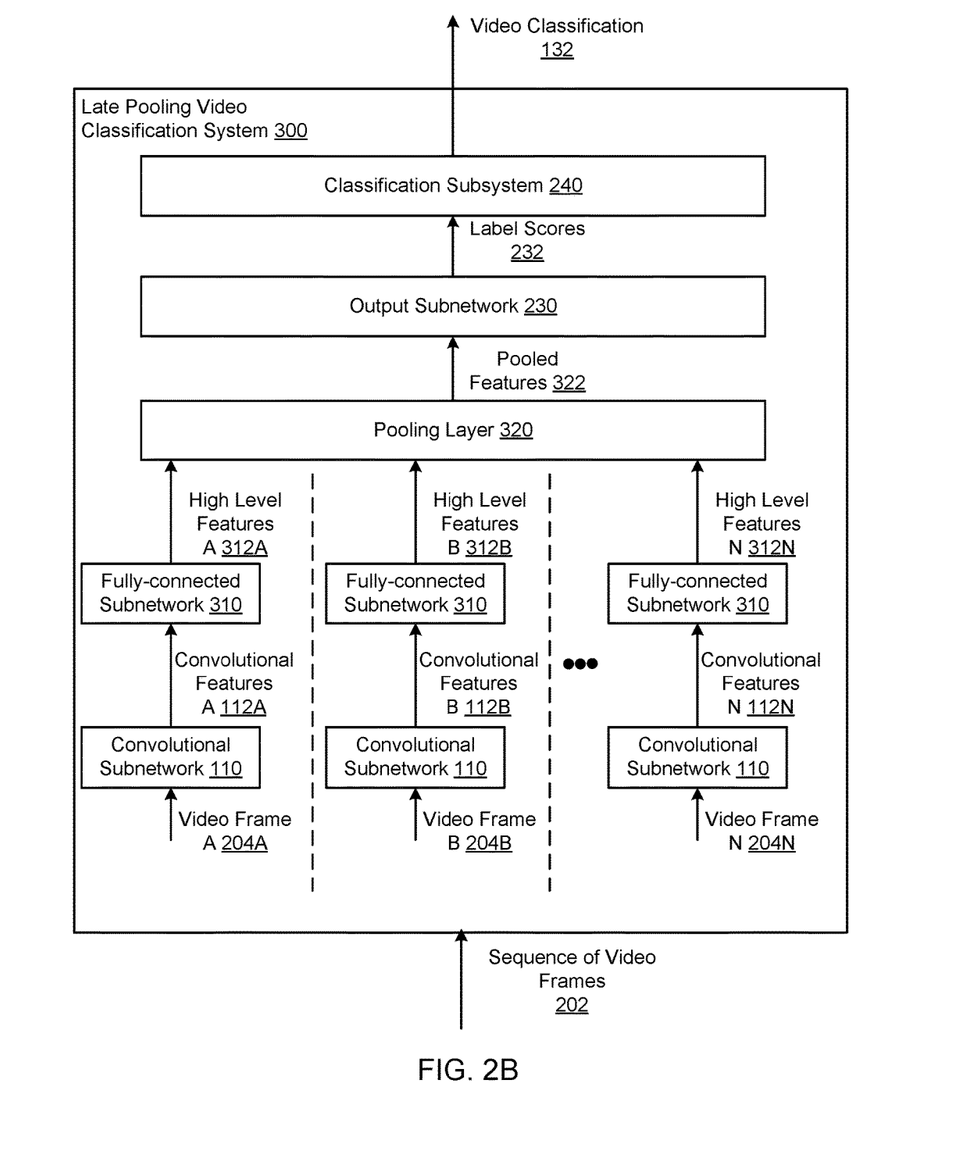
FIG. 2B shows an example late pooling video classification system.

FIG. 2B shows an example late pooling video classification system 300.

The video classification system 300 is an example of a system implemented as computer programs on one or more computers in one or more locations, in which the systems, components, and techniques described below are implemented.

In particular, the video classification system 300 includes the convolutional subnetwork 110 that processes each of the video frames 104A-104N in the sequence 102 to generate the convolutional features 112A-N of the video frames, a fully-connected subnetwork 310, a pooling layer 320, the output subnetwork 230, and the classification subsystem 240.

The fully-connected subnetwork 310 includes one or more fully-connected neural network layers and is configured to process each of the convolutional features 112A-N to generate high level features 312A-N from the convolutional features 112A-N.

The pooling layer 320 is configured to apply max pooling on the high level features 312A-N to generate pooled features 322. That is, for each dimension of the high level feature vectors, the pooling layer 320 is configured to select the maximum value of the dimension among all of the high level features 312A-N and to set the value of the corresponding dimension in the pooled feature vector 322 to that maximum value.

Thus, in contrast to the cony pooling video classification system 200, the late pooling video classification system 300 performs max pooling directly on high-level information rather on the convolutional features of the frames.

The output subnetwork 230 is configured to receive the pooled features 322 and to generate a set of label scores 232, which the classification subsystem 240 then uses to classify the video based on the set of label scores 232.

Figure 2C:
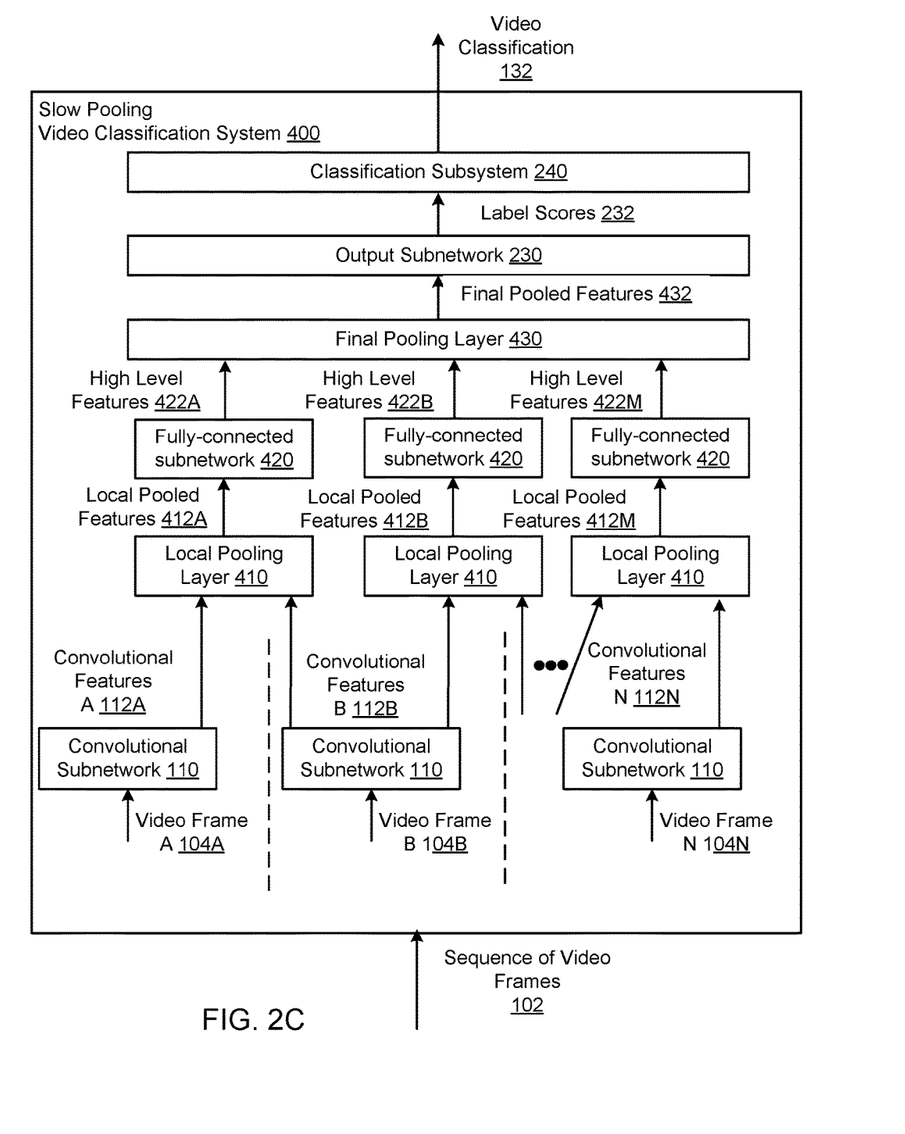
FIG. 2C shows an example slow pooling video classification system.

FIG. 2C shows an example slow pooling video classification system 400.

The video classification system 400 is an example of a system implemented as computer programs on one or more computers in one or more locations, in which the systems, components, and techniques described below are implemented.

In particular, the video classification system 400 includes the convolutional subnetwork 110 that processes each of the video frames 104A-104N in the sequence 102 to generate the convolutional features 112A-N of the video frames, a local pooling layer 410, a fully-connected subnetwork 420, a final pooling layer 430, the output subnetwork 230, and the classification subsystem 240.

During the processing of the sequence 102, the video classification system 400 divides the frames 104A-104N into M subsets, where M is an integer greater than 1.

The local pooling layer 410 is then configured to, for each subset, perform max pooling on the convolutional features of the frames in the subset to generate respective local pooled features 412A-M for each subset. That is, for each subset and for each dimension of the convolutional feature vectors in the subset, the local pooling layer 410 is configured to select the maximum value of the dimension among all of the convolutional feature vectors in the subset and to set the value of the corresponding dimension in the local pooled feature vector for the subset to that maximum value.

The fully-connected subnetwork 420 includes one or more fully-connected neural network layers and is configured to, for each subset, process the local pooled features for the subset to generate respective high level features 422A-422M for each of the subsets.

The final pooling layer is configured to perform max pooling on the high level features 422A-422M to generate final pooled features 432, which are then used as input by the output subnetwork 230.

Thus, in contrast in to the cony pooling video classification system 200 and the late pooling video classification system 300, the slow pooling video classification system 400 employs two-phase pooling in order to group temporally local features before combining high level information from many frames.

Figure 2D:
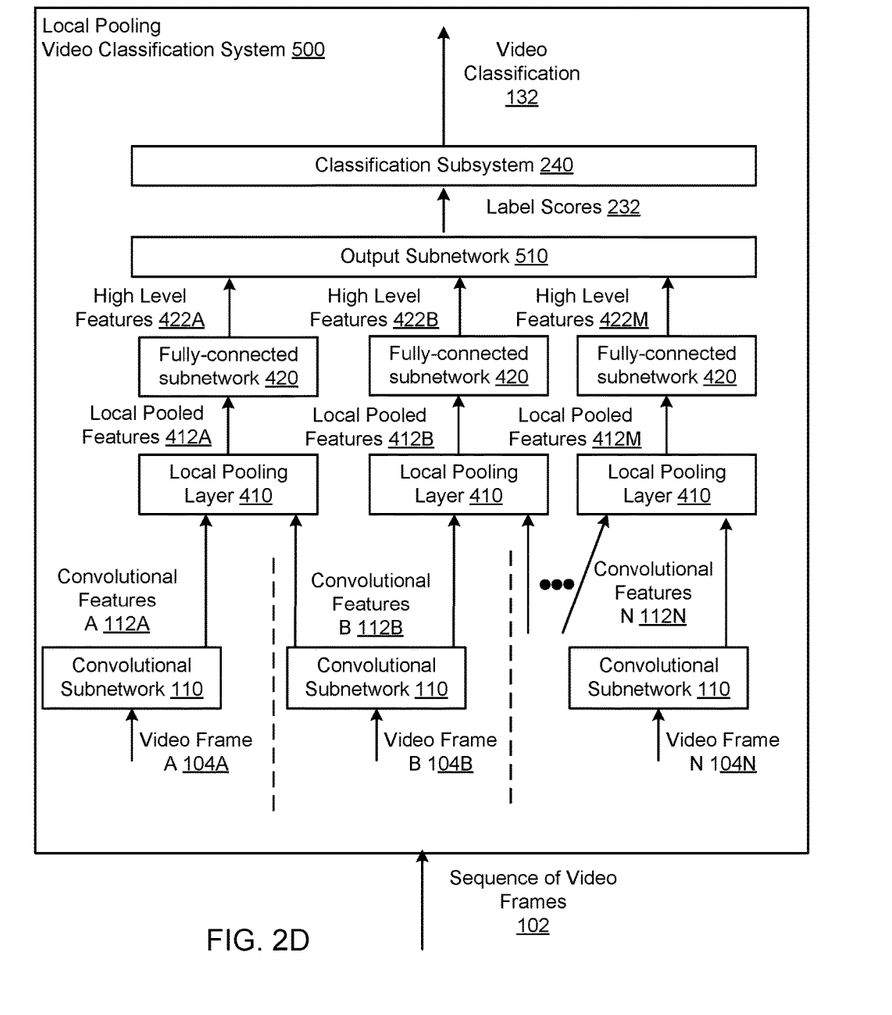
FIG. 2D shows an example local pooling video classification system.

FIG. 2D shows an example local pooling video classification system 500.

The video classification system 500 is an example of a system implemented as computer programs on one or more computers in one or more locations, in which the systems, components, and techniques described below are implemented.

In particular, the video classification system 500 includes the convolutional subnetwork 110 that processes each of the video frames 104A-104N in the sequence 102 to generate the convolutional features 112A-N of the video frames, the local pooling layer 410, the fully-connected subnetwork 420, an output subnetwork 510, and the classification subsystem 240.

Like the slow pooling video classification system 400, during the processing of the sequence 102, the local video classification system 500 divides the frames 104A-104N into M subsets, where M is an integer greater than 1, and uses the convolutional subnetwork 110, the local pooling layer 410, and the fully-connected subnetwork 420 to generate high level features 422A-422M for each of the M subsets. Unlike the slow pooling video classification system 400, however, the local video classification system 500 does not then perform pooling on the high level features 422A-422M. Instead, the output subnetwork 510 is configured to receive all of the high level features 422A-422M, e.g., as a concatenation, and to process the high level features to generate the label scores 232 directly from the high level features 422A-422M.

Figure 2E:
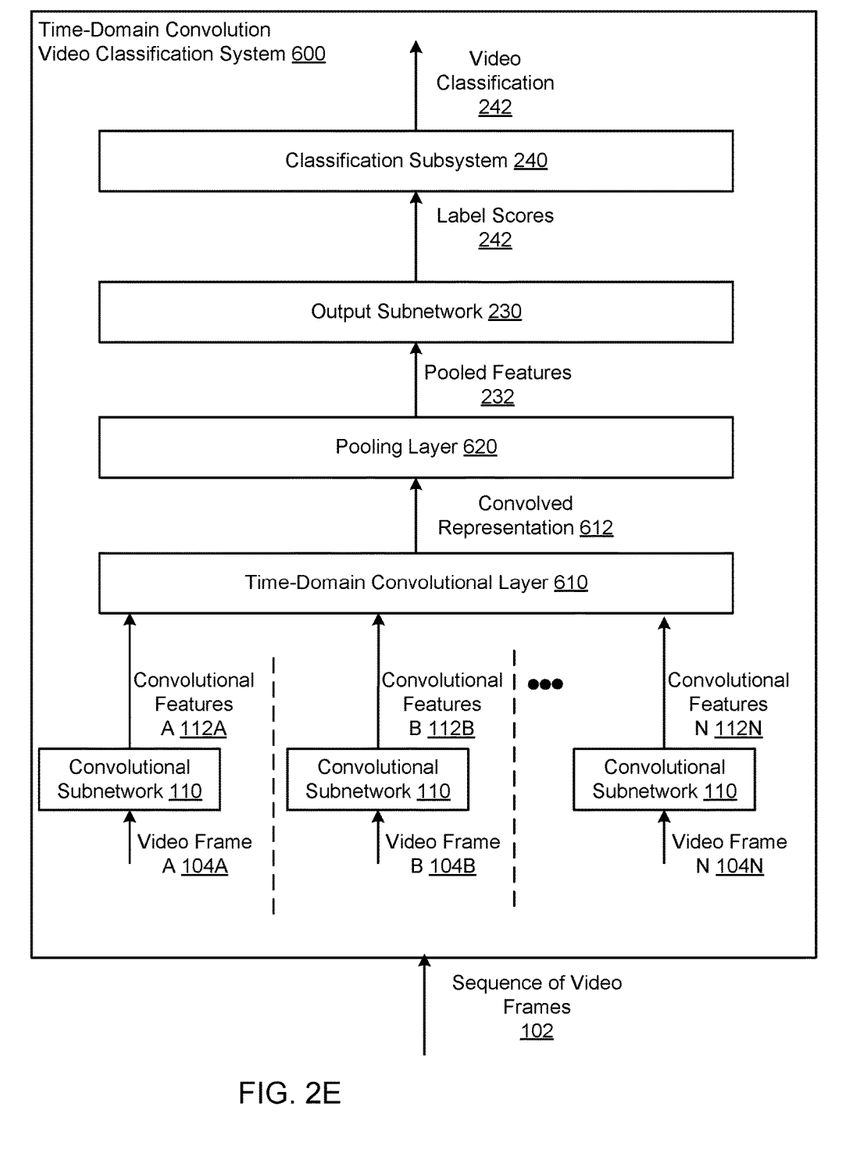
FIG. 2E shows an example time-domain convolution video classification system.

FIG. 2E shows an example time-domain convolution video classification system 600.

The video classification system 600 is an example of a system implemented as computer programs on one or more computers in one or more locations, in which the systems, components, and techniques described below are implemented.

In particular, the video classification system 600 includes the convolutional subnetwork 110 that processes each of the video frames 104A-104N in the sequence 102 to generate the convolutional features 112A-N of the video frames, a time-domain convolutional layer 610, a pooling layer 620, the output subnetwork 230, and the classification subsystem 240.

The time-domain convolutional layer 610 is configured to apply a time-domain convolution to the convolutional features 112A-N to generate a convolved representation 612 of the features 112A-N and the pooling layer 620 is configured to then perform max pooling on the temporal domain of the convolved representation 612 to generate the pooled features 232. Thus, as compared to the cony pooling classification system 200, the time-domain convolution video classification system 600 applies an extra time-domain convolution to the convolutional features before they are pooled in an attempt to capture local relationships between frames within small temporal windows.

Figure 3:
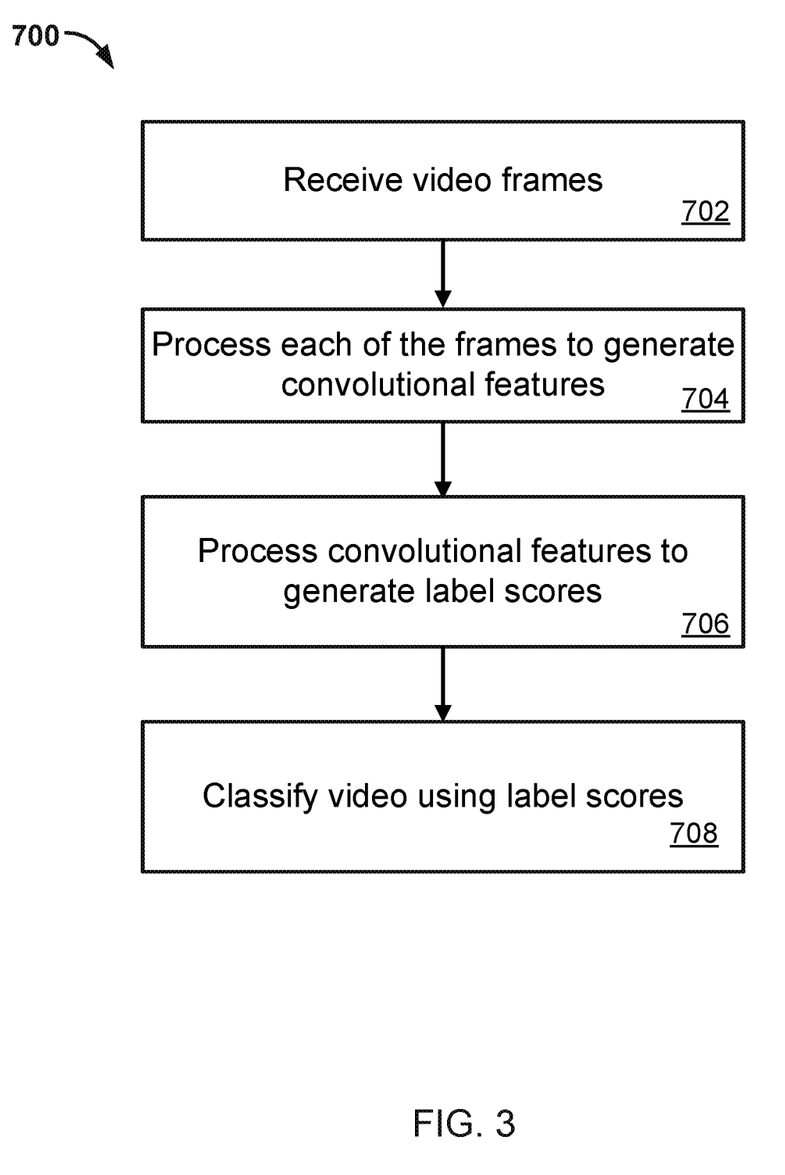
FIG. 3 is a flow diagram of an example process for classifying a video using an LSTM video classification system.

FIG. 3 is a flow diagram of an example process 700 for classifying a video using an LSTM video classification system. For convenience, the process 700 will be described as being performed by a system of one or more computers located in one or more locations. For example, an LSTM video classification system, e.g., the LSTM video classification system 100 of FIG. 1, appropriately programmed in accordance with this specification, can perform the process 700.

The system receives a sequence of video frames from the video (step 702). The sequence of video frames includes a respective video frame at each of multiple time steps. The video frames in the sequence include video frames extracted from the video and, optionally, optical flow images generated from adjacent frames in the video.

For each time step, the system processes the video frame at the time step using a convolutional neural network, e.g., the convolutional subnetwork 110 of FIG. 1, to generate convolutional features of the video frame (step 704).

For each time step, the system processes the convolutional features of the video frame at the time step using an LSTM neural network, e.g., the LSTM subnetwork 120 of FIG. 1, to generate a set of label scores for the time step (step 706). In particular, the LSTM neural network includes one or more LSTM layers that are configured to, for each time step, process the convolutional features of the video frame at the time step to generate an LSTM output. The LSTM neural network also includes an output layer that is configured to, for each time step, process the LSTM output for the time step to generate the label scores for the time step.

The system classifies the video as relating to one or more topics that are represented by labels in the set of labels using the label scores for the time steps, e.g., as described above with reference to FIG. 1 (step 708).

The system can perform the process 700 for a neural network input for which the desired output, i.e., the neural network output that should be generated by the system for the input, is not known. That is, the system can perform the process 700 on a sequence of frames from a video for which the topic that should be predicted is not known.

The system can also perform the process 700 on inputs in a set of training samples, i.e., a set of inputs for which the output that should be predicted by the system is known, in order to train the system, i.e., to determine trained values for the parameters of the LSTM neural network and the convolutional subnetwork. In particular, the process 700 can be performed repeatedly on inputs selected from a set of training samples as part of a machine learning training technique to train the neural network, e.g., a stochastic gradient descent back-propagation training technique.

In particular, the system can train the convolutional neural network and the LSTM neural network on a set of training sequences to determine trained values of the parameters of the LSTM neural network and the convolutional neural network, where each training sequence includes video frames from a training video and each training video is associated with a training label.

During the training and for a given training sequence, the system can determine a gradient for each time step using the label associated with the training sequence and the label scores for the time step and backpropagate the gradients for the time step through the LSTM neural network and the convolutional neural network to update the current values of the parameters.

In some implementations, the system assigns a weight to each time step so that weights assigned to time steps later in the training sequence are higher than weights assigned to time steps earlier in the training sequence and, prior to backpropagating the gradient for the time step, adjusts the gradient using the weight for the time step, e.g., by multiplying the gradient by the weight for the time step.

Additionally, in some implementations, the system also trains the convolutional neural network and the LSTM neural network on optical flow images derived from training videos and performs a late fusion to combine the results of the training of the convolutional neural network and the LSTM neural network on the set of training sequences and the training of the convolutional neural network and the LSTM neural network on the optical flow images.

Figure 4:
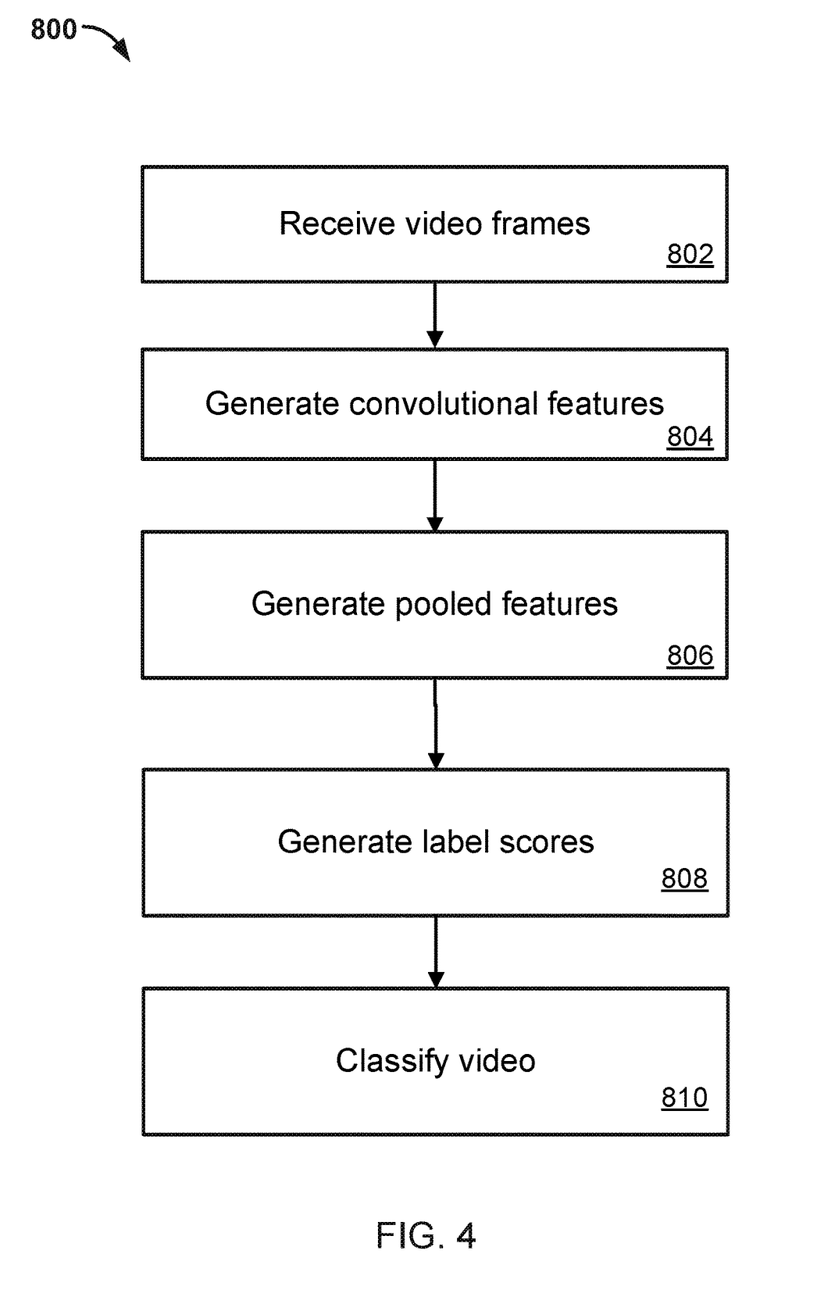
FIG. 4 is a flow diagram of an example process for classifying a video using a video classification system that includes one or more pooling layers.

FIG. 4 is a flow diagram of an example process 800 for classifying a video using a video classification system that includes one or more pooling layers. For convenience, the process 800 will be described as being performed by a system of one or more computers located in one or more locations. For example, a video classification system that includes one or more pooling layers, e.g., the video classification systems 200, 300, 400, 500, or 600 of FIG. 1, appropriately programmed in accordance with this specification, can perform the process 800.

The system receives video frames from the video (step 802). The video frames include video frames extracted from the video and, optionally, optical flow images generated from adjacent frames in the video.

The system processes each of the video frames using a convolutional neural network, e.g., the convolutional subnetwork 110 of FIGS. 2A-2E, to generate convolutional features of video frame (step 804).

The system generates pooled features from the convolutional features of each of the video frames (step 806). The manner in which the system generates the pooled features from the convolutional features is dependent on the architecture of the neural network employed by the system.

For example, if the system is a cony pooling video classification system, the system processes the convolutional features directly using a pooled layer to generate the pooled features.

The system generates a set of label scores for the video from the max-pooled features (step 808). The manner in which the system generates the label scores features from the convolutional features is dependent on the architecture of the neural network employed by the system.

The system classifies the particular video as relating to one or more of the topics represented by labels from the label scores, e.g., by selecting the topics represented by one or more highest-scoring labels (step 810).

The system can perform the process 800 for a neural network input for which the desired output, i.e., the neural network output that should be generated by the system for the input, is not known. That is, the system can perform the process 800 on a sequence of frames from a video for which the topic that should be predicted is not known.

The system can also perform the process 800 on inputs in a set of training samples, i.e., a set of inputs for which the output that should be predicted by the system is known, in order to train the components of the system, i.e., to determine trained values for the parameters of the convolutional neural network and the other neural network layers included in the system. In particular, the process 800 can be performed repeatedly on inputs selected from a set of training samples as part of a machine learning training technique to train the neural network layers, e.g., a stochastic gradient descent back-propagation training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining a temporal sequence of video frames, wherein the temporal sequence comprises a respective video frame from a particular video at each of a plurality time steps;
    for each time step of the plurality of time steps:
        processing the video frame at the time step using a convolutional neural network to generate features of the video frame; and
        processing the features of the video frame using a long short-term memory (LSTM) neural network to generate a set of label scores for the time step, the set of label scores comprising a respective label score for each label in a predetermined set of labels, each label in the set of predetermined set of labels representing a respective topic; and
    classifying the video as relating to one or more of the topics represented by labels in the set of labels from the label scores for each of the plurality of time steps, wherein classifying the video as relating to one or more of the topics comprises:
        assigning a respective weight to each of the time steps in the temporal sequence of video frames, wherein weights assigned to time steps later in the temporal sequence are higher than weights assigned to time steps earlier in the temporal sequence;
        generating a respective weighted combined label score for each of the labels, comprising, for each label:
            for each time step, multiplying (i) the label score generated by the LSTM neural network for the label for the time step by (ii) the weight assigned to the time step to generate a weighted label score, and
            combining the weighted label scores for the time steps to generate the weighted combined label score for the label; and
        selecting topics represented by one or more highest-scoring labels according to the weighted combined label scores.

2. The method of claim 1, wherein the LSTM neural network comprises:
    one or more LSTM neural network layers configured to, for each time step, receive the features of the video frame at the time step and process the features to generate an LSTM output for the time step; and
    an output layer configured to, for each time step, receive the LSTM output for the time step and process the LSTM output to generate the set of label scores for the time step.

3. The method of claim 1, wherein combining the weighted label scores for the time steps to generate the weighted combined label score for the label comprises:
    generating the weighted combined label score for the label by summing the weighted label scores for the label for the plurality of time steps.

4. The method of claim 1, further comprising:
    training the convolutional neural network and the LSTM neural network on a set of training sequences, each training sequence comprising a plurality of video frames from a training video at each of the plurality of time steps, each training video being associated with a training label.

5. The method of claim 4, wherein training the convolutional neural network and the LSTM neural network comprises, for each of the plurality of time steps in a particular training sequence, backpropagating gradients for the time step through the LSTM neural network and the convolutional neural network.

6. The method of claim 5, wherein backpropagating the gradients for the time step comprises:
    assigning a weight to each time step, wherein weights assigned to time steps later in the training sequence are higher than weights assigned to time steps earlier in the training sequence; and
    prior to backpropagating the gradient for the time step, adjusting the gradient using the weight for the time step.

7. The method of claim 4, further comprising:
    training the convolutional neural network and the LSTM neural network on a plurality of optical flow images; and
    performing a late fusion to combine results of the training of the convolutional neural network and the LSTM neural network on the set of training sequences and the training of the convolutional neural network and the LSTM neural network on the plurality of optical flow images.

8. A system comprising one or more computers and one or more storage devices storing instructions that, when executed by the one or more computers, cause the one or more computers to perform operations comprising:
   obtaining a temporal sequence of video frames, wherein the temporal sequence comprises a respective video frame from a particular video at each of a plurality time steps;
   for each time step of the plurality of time steps:
      processing the video frame at the time step using a convolutional neural network to generate features of the video frame; and
      processing the features of the video frame using a long short-term memory (LSTM) neural network to generate a set of label scores for the time step, the set of label scores comprising a respective label score for each label in a predetermined set of labels, each label in the set of predetermined set of labels representing a respective topic; and
   classifying the video as relating to one or more of the topics represented by labels in the set of labels from the label scores for each of the plurality of time steps, wherein classifying the video as relating to one or more of the topics comprises:
   assigning a respective weight to each of the time steps in the temporal sequence of video frames, wherein weights assigned to time steps later in the temporal sequence are higher than weights assigned to time steps earlier in the temporal sequence;
   generating a respective weighted combined label score for each of the labels, comprising, for each label:
      for each time step, multiplying (i) the label score generated by the LSTM neural network for the label for the time step by (ii) the weight assigned to the time step to generate a weighted label score, and
      combining the weighted label scores for the time steps to generate the weighted combined label score for the label; and
   selecting topics represented by one or more highest-scoring labels according to the weighted combined label scores.

9. The system of claim 8, wherein the LSTM neural network comprises:
   one or more LSTM neural network layers configured to, for each time step, receive the features of the video frame at the time step and process the features to generate an LSTM output for the time step; and
   an output layer configured to, for each time step, receive the LSTM output for the time step and process the LSTM output to generate the set of label scores for the time step.

10. The system of claim 8, wherein combining the weighted label scores for the time steps to generate the weighted combined label score for the label comprises:
    generating the weighted combined label score for the label by summing the weighted label scores for the label for the plurality of time steps.

11. The system of claim 8, the operations further comprising:
    training the convolutional neural network and the LSTM neural network on a set of training sequences, each training sequence comprising a plurality of video frames from a training video at each of the plurality of time steps, each training video being associated with a training label.

12. The system of claim 11, wherein training the convolutional neural network and the LSTM neural network comprises, for each of the plurality of time steps in a particular training sequence, backpropagating gradients for the time step through the LSTM neural network and the convolutional neural network.

13. The system of claim 12, wherein backpropagating the gradients for the time step comprises:
    assigning a weight to each time step, wherein weights assigned to time steps later in the training sequence are higher than weights assigned to time steps earlier in the training sequence; and
    prior to backpropagating the gradient for the time step, adjusting the gradient using the weight for the time step.

14. The system of claim 11, the operations further comprising:
    training the convolutional neural network and the LSTM neural network on a plurality of optical flow images; and
    performing a late fusion to combine results of the training of the convolutional neural network and the LSTM neural network on the set of training sequences and the training of the convolutional neural network and the LSTM neural network on the plurality of optical flow images.

15. One or more non-transitory computer-readable storage media storing instructions that, when executed by one or more computers, cause the one or more computers to perform operations comprising:
    obtaining a temporal sequence of video frames, wherein the temporal sequence comprises a respective video frame from a particular video at each of a plurality time steps;
    for each time step of the plurality of time steps:
       processing the video frame at the time step using a convolutional neural network to generate features of the video frame; and
       processing the features of the video frame using a long short-term memory (LSTM) neural network to generate a set of label scores for the time step, the set of label scores comprising a respective label score for each label in a predetermined set of labels, each label in the set of predetermined set of labels representing a respective topic; and
    classifying the video as relating to one or more of the topics represented by labels in the set of labels from the label scores for each of the plurality of time steps, wherein classifying the video as relating to one or more of the topics comprises:
    assigning a respective weight to each of the time steps in the temporal sequence of video frames, wherein weights assigned to time steps later in the temporal sequence are higher than weights assigned to time steps earlier in the temporal sequence;
    generating a respective weighted combined label score for each of the labels, comprising, for each label:
       for each time step, multiplying (i) the label score generated by the LSTM neural network for the label for the time step by (ii) the weight assigned to the time step to generate a weighted label score, and
       combining the weighted label scores for the time steps to generate the weighted combined label score for the label; and selecting topics represented by one or more highest-scoring labels according to the weighted combined label scores.

16. The computer-readable storage media of claim 15, wherein the LSTM neural network comprises:
   one or more LSTM neural network layers configured to, for each time step, receive the features of the video frame at the time step and process the features to generate an LSTM output for the time step; and
   an output layer configured to, for each time step, receive the LSTM output for the time step and process the LSTM output to generate the set of label scores for the time step.

17. The computer-readable storage media of claim 15, wherein combining the weighted label scores for the time steps to generate the weighted combined label score for the label comprises:
   generating the weighted combined label score for the label by summing the weighted label scores for the label for the plurality of time steps.

18. The computer-readable storage media of claim 15, the operations further comprising:
   training the convolutional neural network and the LSTM neural network on a set of training sequences, each training sequence comprising a plurality of video frames from a training video at each of the plurality of time steps, each training video being associated with a training label.

19. The computer-readable storage media of claim 18, wherein training the convolutional neural network and the LSTM neural network comprises, for each of the plurality of time steps in a particular training sequence, backpropagating gradients for the time step through the LSTM neural network and the convolutional neural network.

20. The computer-readable storage media of claim 19, wherein backpropagating the gradients for the time step comprises:
   assigning a weight to each time step, wherein weights assigned to time steps later in the training sequence are higher than weights assigned to time steps earlier in the training sequence; and
   prior to backpropagating the gradient for the time step, adjusting the gradient using the weight for the time step.

21. The computer-readable storage media of claim 18, the operations further comprising:
   training the convolutional neural network and the LSTM neural network on a plurality of optical flow images; and
   performing a late fusion to combine results of the training of the convolutional neural network and the LSTM neural network on the set of training sequences and the training of the convolutional neural network and the LSTM neural network on the plurality of optical flow images.

* * * * *